(12) United States Patent
He et al.

(10) Patent No.: US 10,052,245 B2
(45) Date of Patent: Aug. 21, 2018

(54) FOLDING WHEELCHAIR

(71) Applicant: Changzhou Golden Motor Technology Co., Ltd., Changzhou (CN)

(72) Inventors: Zhang He, Changzhou (CN); Guohua Yao, Changzhou (CN); Limin Zhang, Changzhou (CN); Bo Rao, Changzhou (CN)

(73) Assignee: Changzhou Golden Motor Technology Co., Ltd., Changzhou (CN)

( * ) Notice: Subject to any disclaimer, the term of this patent is extended or adjusted under 35 U.S.C. 154(b) by 0 days.

(21) Appl. No.: 15/395,507

(22) Filed: Dec. 30, 2016

(65) Prior Publication Data

US 2017/0105891 A1    Apr. 20, 2017

Related U.S. Application Data

(63) Continuation of application No. PCT/CN2015/082904, filed on Jun. 30, 2015.

(30) Foreign Application Priority Data

Nov. 5, 2014    (CN) .................... 2014 2 0655124 U

(51) Int. Cl.
*A61G 5/08*    (2006.01)
*A61G 5/12*    (2006.01)
*A61G 5/04*    (2013.01)

(52) U.S. Cl.
CPC .............. *A61G 5/085* (2016.11); *A61G 5/045* (2013.01); *A61G 5/0866* (2016.11);
(Continued)

(58) Field of Classification Search
CPC ...... A61G 5/085; A61G 5/0866; A61G 5/045; B62B 7/068; B62B 7/08; B62B 7/10
See application file for complete search history.

(56) References Cited

U.S. PATENT DOCUMENTS

| | | | |
|---|---|---|---|
| 3,807,520 A * | 4/1974 | Chisholm | A61G 5/045 180/6.5 |
| 6,938,911 B1 * | 9/2005 | Shyu | A61G 5/08 280/250.1 |

(Continued)

*Primary Examiner* — Katy M Ebner
(74) *Attorney, Agent, or Firm* — Wayne & King LLC

(57) ABSTRACT

A folding wheelchair, including a back frame a seat frame a lower frame, two rear wheel assemblies, two front wheel assemblies and an armrest; the armrest and the seat frame are hingedly connected to the back frame from top to bottom in a sequence; the two front wheel assemblies is connected to the lower frame; a sliding guide rail is provided between one end of the seat frame and each rear wheel assembly, and is provided with a sliding block thereon in a sliding fit manner; the sliding block is hingedly connected to a lower end of the back frame and the lower frame or the lower end of the back frame is hingedly connected to the sliding block and the lower frame; or the lower frame is hingedly connected to the lower end of the back frame and the sliding block The folding wheelchair is safe and reliable touse, and can be folded smoothly and quickly; in addition, the folded wheelchair has a small size, and is convenient to lean, against a wall, occupies a small space in a vehicle trunk or under a bed, and is convenient to use when going out.

6 Claims, 7 Drawing Sheets

(52) U.S. Cl.
CPC ............ *A61G 5/0883* (2016.11); *A61G 5/122* (2016.11); *A61G 5/125* (2016.11); *A61G 5/128* (2016.11); *A61G 2203/10* (2013.01); *B60Y 2200/84* (2013.01)

(56) References Cited

U.S. PATENT DOCUMENTS

| | | | | |
|---|---|---|---|---|
| 7,988,171 | B2* | 8/2011 | Chong | A61G 5/08 280/250.1 |
| 8,998,245 | B1* | 4/2015 | Anooshian | A61G 5/08 280/649 |
| 2003/0030243 | A1* | 2/2003 | Engels | A61G 5/045 280/250.1 |
| 2007/0278767 | A1* | 12/2007 | Aubert | A61G 5/045 280/642 |
| 2008/0100036 | A1* | 5/2008 | Ivanchenko | A61G 5/006 280/648 |
| 2009/0284037 | A1* | 11/2009 | Wang | A61G 5/08 296/65.05 |
| 2009/0309336 | A1* | 12/2009 | Hanson | A61G 5/08 280/647 |
| 2010/0007114 | A1* | 1/2010 | Papi | A61G 5/1002 280/304.1 |
| 2010/0140898 | A1* | 6/2010 | Purdue | A61G 5/023 280/250.1 |
| 2010/0327557 | A1* | 12/2010 | Wang | A61G 5/045 280/304.1 |
| 2013/0026737 | A1* | 1/2013 | Pizzi Spadoni | A61G 5/061 280/647 |
| 2015/0060156 | A1* | 3/2015 | Husted | A61G 5/045 180/6.48 |
| 2015/0061263 | A1* | 3/2015 | Cheng | B62B 3/02 280/641 |
| 2017/0224558 | A1* | 8/2017 | Zi | A61G 5/045 |

* cited by examiner

A-A

FOLDING WHEELCHAIR

CROSS-REFERENCE TO RELATED APPLICATIONS

This application is a continuation of International Patent Application No. PCT/CN2015/082904 with a filing date of Jun. 30, 2015, designating the United States, now pending, and further claims priority to Chinese Patent Application No 201420655124.9 with a filing date of Nov. 5, 2014, The content of the aforementioned application, including any intervening amendments thereto, are incorporated herein by reference.

TECHNICAL FIELD

The utility model relates vehicle, and in particular relates to a folding wheelchair.

BACKGROUND OF THE PRESENT INVENTION

At present, people use various equipment, such as an electric wheelchair, a wheelchair and the like, which can help inconvenient people to move and act conveniently. Generally, although the wheelchair provides convenience to users in middle-distance and long-distance activities, the wheelchair cannot be folded in implementation, causing that the wheelchair occupies a quite large space when not in use, resulting in great inconvenience to transportation and storage. Although the wheelchair is designed into an assembly-disassembly structure by someone so as to facilitate folding of the wheelchair after proper disassembly when the wheelchair is not used to reduce occupied space of the wheelchair, an assembly-disassembly process is quite time-consuming and inconvenient, causing that the existing wheelchair still has a quite large room for improvement in folding.

SUMMARY OF PRESENT INVENTION

The utility model aims at providing a folding wheelchair which can be folded smoothly and quickly and stored conveniently.

In order to achieve the above purposes, the technical solution of the utility model is as follows: the folding wheelchair comprises a back frame, a seat frame, a lower frame, two rear wheel assemblies, two front wheel assemblies and armrests, wherein the armrests and the seat frame are hinged to the back frame from top to bottom in sequence, and the two front wheel assemblies are assembled and connected with the lower frame; the folding wheelchair has the innovations that 1), a sliding guide rail is arranged between one end of the seat frame and each rear wheel assembly, and a sliding block is arranged on each sliding guide rail in a sliding fit manner; and 2) the sliding blocks are hinged with the lower end of the back frame and are also hinged, assembled and connected with the lower frame, or the lower end of the back frame is hinged with the sliding blocks and is, also hinged, assembled and connected with the lower frame, or the lower frame is hinged with the lower end of the back frame and is also hinged, assembled and connected with the sliding blocks.

The folding wheelchair further comprises a latch frame and latches, each sliding block is provided with a lock cylinder extending outwards from the side surface of the sliding block, the latch frame is fixedly connected with the lock cylinders, the latch frame is a C-shaped tube, the latches are assembled and connected in the tube, in a sliding fit manner, and each lock cylinder is provided with a stepped latch hole; each latch comprises a pull handle, a pull rod, a spring, a bolt and a jackscrew, wherein the pull handle is fixedly connected to the pull rod, the pull rod is assembled and connected in the tube of the latch frame in a sliding fit manner, the pull handle extends out of an opening of the C-shaped tube latch frame, one end of the pull rod, which is close to the sliding block, is provided with the bolt, and the bolt penetrates through the latch hole and is fixedly connected with the pull rod through the jackscrew; and the spring is sleeved on the bolt, one end of the spring is abutted against a step surface of the stepped latch hole, and the other end of the spring is abutted against a step surface arranged on the bolt.

Each rear wheel assembly comprises a rear wheel bracket and a rear wheel, and the sliding guide rail is arranged between one end of the seat frame and the rear wheel bracket of each rear wheel assembly; and each front wheel assembly comprises a front wheel bracket and a front wheel, and the front wheel bracket of each front wheel assembly is hinged, assembled and connected with the lower frame and the seat frame respectively, The rear wheel bracket of one rear wheel assembly is assembled and connected with an electrically driven transmission part, and the electrically driven transmission part is linked with one rear wheel in a transmission manner and is electrically connected with an electric controller arranged on one armrest.

The lower frame is also assembled and connected with foot rests.

An armrest support rod is also hinged between each armrest and the seat frame.

Each sliding block is also provided with a fixing plate, the outer wall of the latch frame is provided with a latch frame mounting plate, and the latch frame mounting plate is fixedly connected with the fixing plates of the sliding blocks.

After the above structure is adopted since the sliding guide rail is arranged between one end of the seat frame and each rear wheel assembly, the sliding block is arranged on each sliding guide rail in a sliding fit manner, and the sliding blocks are hinged with the lower end of the back frame and is also hinged, assembled and connected with the lower frame; or the lower frame is hinged with the lower end of the back frame and is also hinged, assembled and connected with the sliding blocks. Meanwhile, the folding wheelchair of the utility model further comprises the latch frame and the latches, each sliding block is provided with the lock cylinder extending outwards from the side surface of the sliding block, the latch frame is fixedly connected with the lock cylinders, the latch frame is the C-shaped tube, the latches are assembled and connected in the tube in a sliding fit manner, and each lock cylinder is provided with the stepped latch hole; each latch comprises the, pull handle, the pull rod, the spring, the bolt and the jackscrew, wherein the pull handle is fixedly connected to the pull rod, the pull rod is assembled and connected in the tube of the latch frame in a sliding fit manner, the pull handle extends out of the opening of the C-shaped tube latch frame, one end of the pull rod, which is close to the sliding block, is provided with the bolt, and the bolt penetrates through the latch hole and is fixedly connected with the pull rod through the jackscrew; the spring is sleeved on the bolt, one end of the spring is abutted against the step surface of the stepped latch hole, and the other end of the spring is abutted against the step surface arranged on the bolt; and when the folding wheelchair is folded, as long as the pull handles of the latches are pulled, the bolts are disengaged from the sliding guide rails, and the pull handles are pulled backwards continuously to drive the latch frame to move backwards, so that the sliding blocks move backwards along the sliding guide rails, and then the back frame and the lower frame can close up and be folded to the seat frame in the middle conveniently. Therefore, synchronous one-time folding in place is realized, the folding is smooth and quick, and the folded wheelchair has a small volume, is convenient to lean against a wall, occupies a small space in a vehicle trunk or under a bed and is also convenient to use when going out.

When the folding wheelchair is unfolded for use, as long as the back frame is pulled upwards to drive the sliding blocks to move forwards along the sliding guide rails till the back frame, the seat frame and the lower frame are completely unfolded. At this moment, the locations of the sliding blocks just enable the latch holes of the sliding blocks to be in axial alignment with positioning holes arranged on the sliding guide rails, and the bolts are inserted into the positioning holes arranged on the sliding guide rails under the effect of the springs; and the locking is more convenient and more reliable. In this way, the wheelchair can be safely used.

DETAILED DESCRIPTION OF PREFERRED EMBODIMENTS

Figure 1:
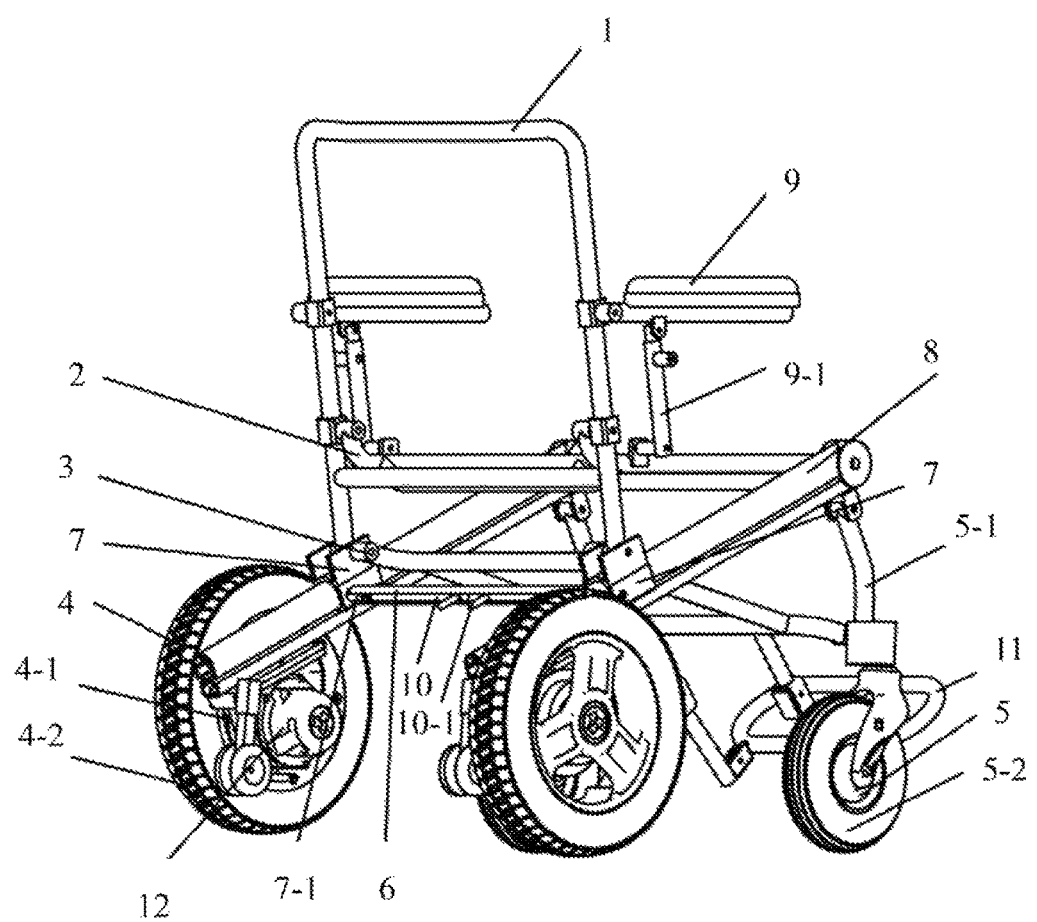
FIG. 1 is a structural schematic diagram of a folding wheelchair of the utility model.

The utility model is further described in detail below in combination with an embodiment shown in drawings.

As shown in FIG. 1-FIG. 7, a folding wheelchair comprises a back frame 1, a seat frame 2, a lower frame 3, two rear wheel assemblies 4, two front wheel assemblies 5 and armrests 9, wherein the armrests 9, the seat frame 2 and the lower frame 3 are hinged to the back frame 1 from top to bottom in sequence, and the two front wheel assemblies 5 are assembled and connected with the lower frame 3; a sliding guide rail 8 is arranged between one end of the seat frame 2 and each rear wheel assembly 4, and a sliding block 7 is arranged on each sliding guide rail 8 in a sliding fit manner; and the sliding blocks 7 are hinged with the lower end of the back frame 1 and are also hinged, assembled and connected with the lower frame 3. Of course, the following structure may also be adopted: the lower end of the back frame 1 is hinged with the sliding blocks 7 arid is also hinged, assembled and connected with the lower frame 3: or another connection manner is adopted: the lower frame 3 is hinged with the lower end of the back frame 1 and is also hinged, assembled and connected with the sliding blocks 7.

The folding wheelchair further comprises a latch frame 6 and latches 10, each sliding block 7 comprises a lock cylinder 7-1 extending outwards from the side surface of the sliding block, the latch frame 6 is fixedly connected with the lock cylinders 7-1 the latch frame 6 is a C-shaped tube, the latches 10 are assembled and connected in the tube in a sliding fit manner, and each lock cylinder 7-1 is provided with a stepped latch hole 7-2: each latch 10 comprises a pull handle 10-1, a pull rod 10-2, a spring 10-3, a bolt 10-4 and a jackscrew 10-6, wherein, the handle 10-1 is fixedly connected to the, pull rod 10-2, the pull rod 10-2 is assembled and connected in the tube of the latch frame 6 in a sliding fit manner, the pull handle 10-1 extends out of an opening of the C-shaped tube latch frame 6, one end of the pull rod 10-2, which is close to the sliding block 7, is provided with the bolt 10-4, and the bolt 10-4 penetrates through the latch hole 7-2 and is fixedly connected with the pull rod 10-2 through the jackscrew 10-5; and the spring 10-3 is sleeved on the bolt 10-4, one end of the spring 10-3 is abutted against a step surface of the stepped latch hole 7-2, and the other end of the spring 10-3 is abutted against a step surface arranged on the bolt 10-4.

For convenient installation, each rear wheel >assembly 4 comprises a rear wheel bracket 4-1 and a rear wheel 4-2, and the sliding guide rail 8 is arranged between one end of the seat frame 2 and the rear wheel bracket 4-1 of each rear wheel assembly 4; and each front wheel assembly 5 comprises a front wheel bracket 5-1 and a front wheel 5-2, and the front wheel bracket 5-1 of each front wheel assembly 5 is hinged, assembled and connected with the lower frame 3 and the seat frame 2 respectively.

For rapid use and easy and labor-saving operation, the rear wheel bracket 4-1 of one rear wheel assembly 4 is assembled and connected with an electrically driven transmission part 12, and the electrically driven transmission part 12 is linked with one rear wheel 4-2 in a transmission manner and is electrically connected with an electric controller 9-2 arranged on one armrest 9.

For safe and comfortable use, the lower frame 3 is also assembled and connected with foot rests 11; and an armrest support rod 9-1 is also hinged between each armrest 9 and the seat frame 2.

In order to avoid vibration of the latch frame 6 and reduce noise when the folding wheelchair is used, each sliding block 7 is also provided with a fixing plate 7-3, the outer wall of the latch frame 6 is provided with a latch frame mounting plate 6-1, and the latch frame mounting plate 6-1 is fixedly connected with the fixing plates 7-3 of the sliding blocks 7.

Figure 2:
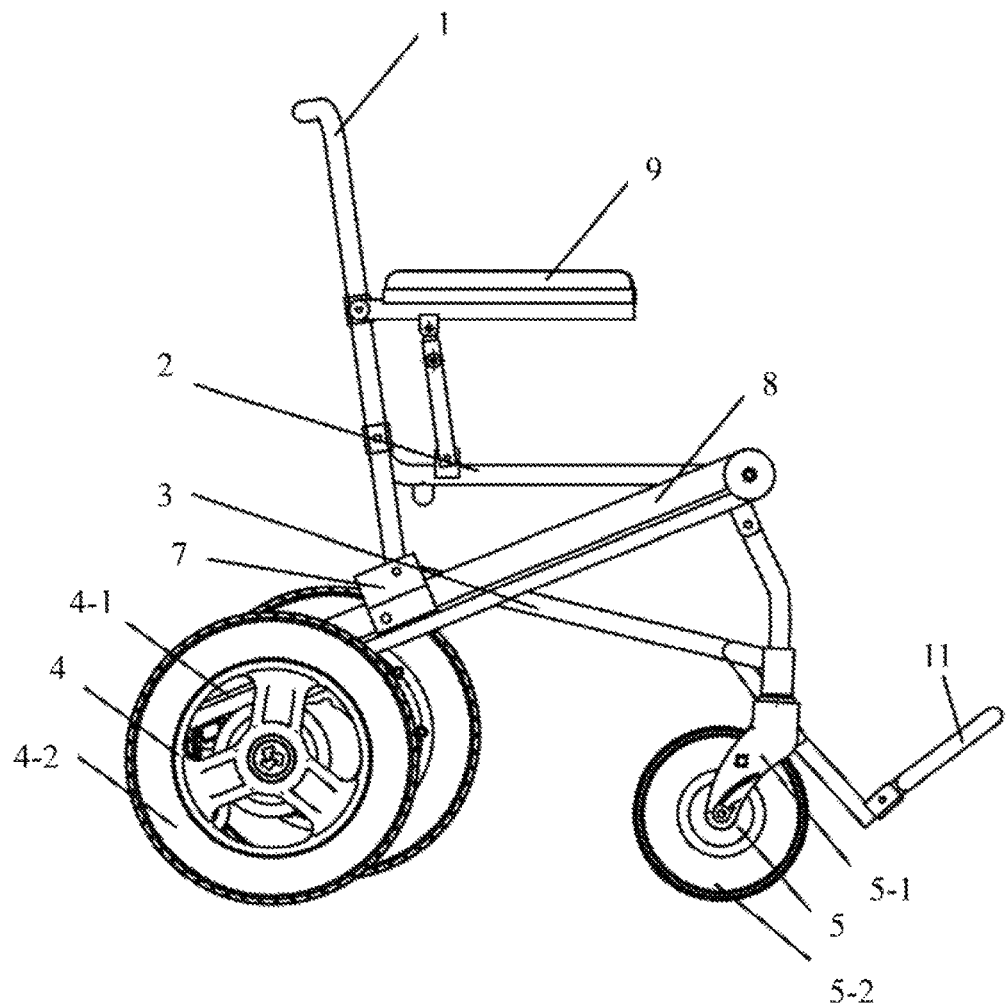
FIG. 2 is a structural schematic diagram of a side face of a folding wheelchair of the utility model.
Figure 3:
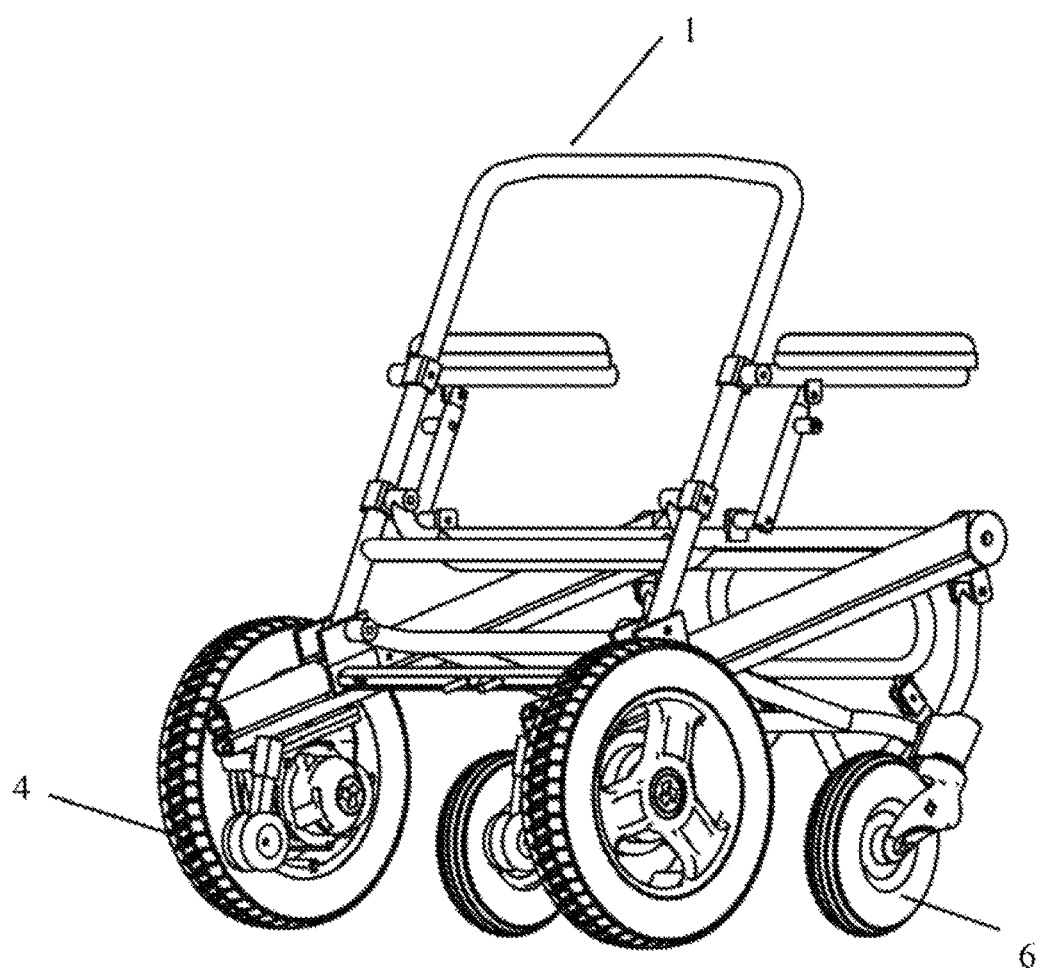
FIG. 3 is a structural schematic diagram of a folding process in FIG. 1.
Figure 4:
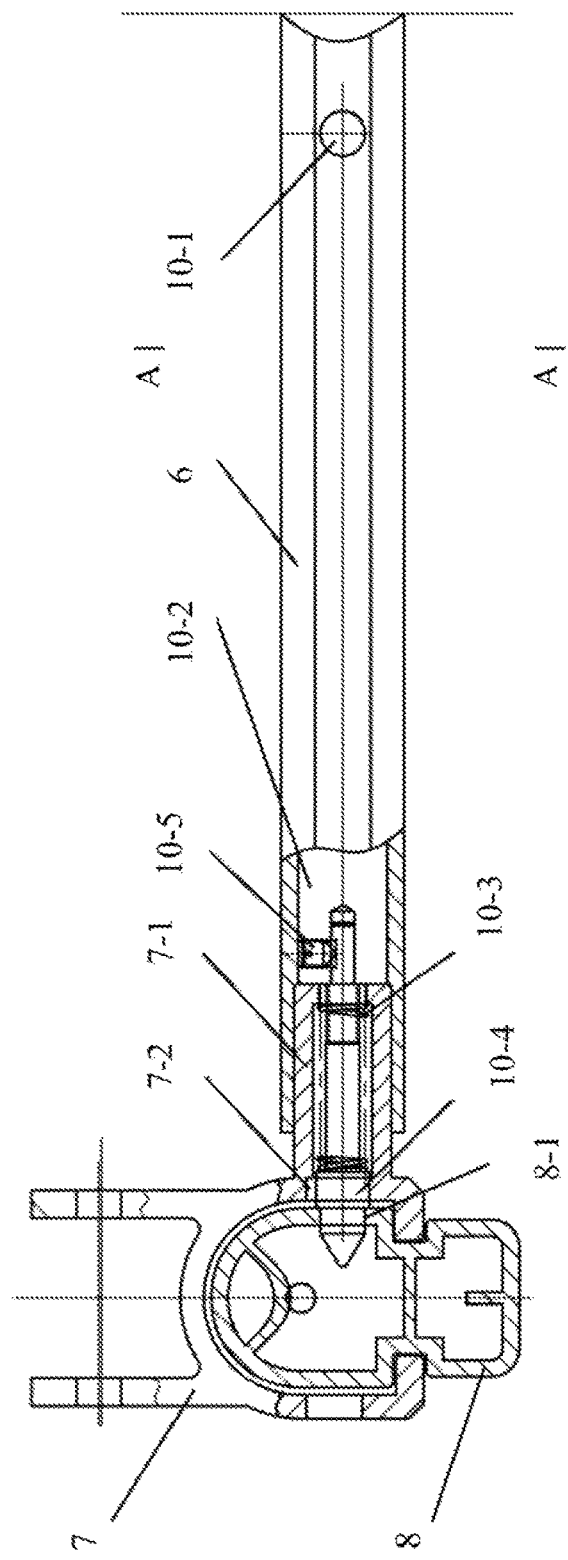
FIG. 4 is a structural schematic diagram of a locking part in FIG. 1.
Figure 5:
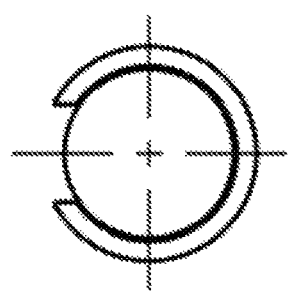
FIG. 5 is an amplified section view of a part I in FIG. 4.
Figure 6:
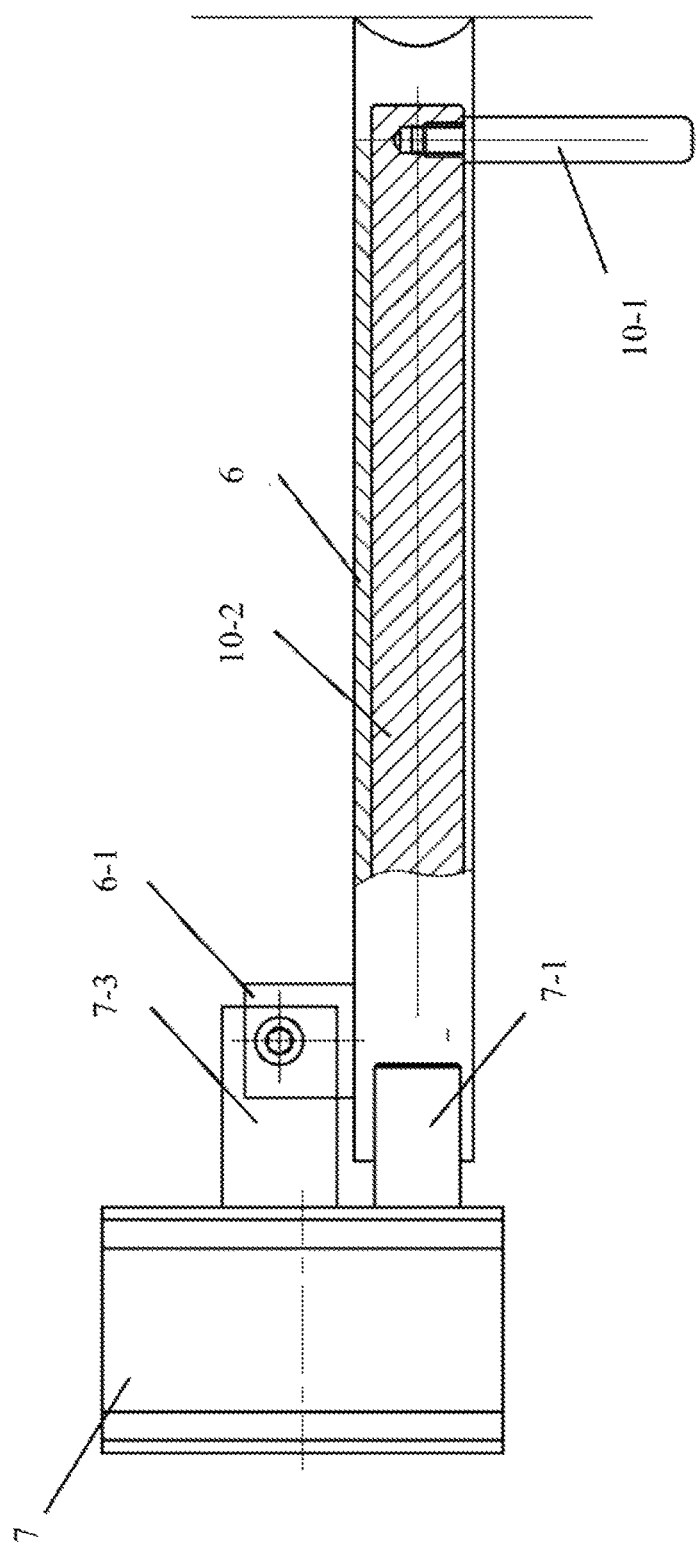
FIG. 6 is an A-direction view of FIG. 4.
Figure 7:
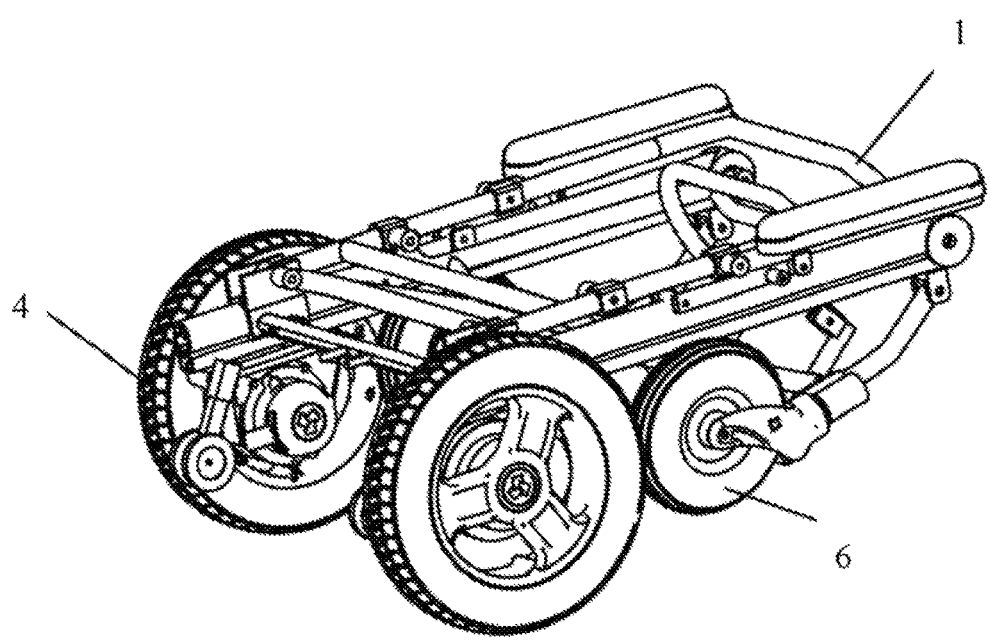
FIG. 7 is a structural schematic diagram of a folded state of a folding wheelchair of the utility model.

A using, state of a folding wheelchair of the utility model before being folded is shown in FIG. 1, FIG. 2, FIG. 3 and FIG. 7. FIG. 3 is a state diagram in a folding process of the utility model. FIG. 7 is a completely folded state diagram after the folding wheelchair is folded. As shown in FIG. 1 and FIG. 2, when the folding wheelchair of the utility model is in a completely unfolded state, then the locations of the sliding blocks 7 just enable the latch holes 7-2 of the sliding blocks 7 to be in axial alignment with positioning holes 8-1 arranged on the sliding guide rails 8, and the bolts 10-4 are inserted into the positioning holes 8-1 arranged in the sliding guide rails 8 under the effect of the springs 10-3. In this way, the wheelchair can be safely used. A user sits on the seat frame 2, and the folding wheelchair can move forwards or backwards freely as long as the user rotates the rear wheels. Since the folding wheelchair is provided with the electrically driven transmission part 12, the wheelchair can move more easily and more smoothly as long as the user operates the electric controller 9-2 arranged on one armrest 9. When the wheelchair needs to be folded, as long as the pull handles 10-1 of the latches are pulled, the bolts 10-4 are disengaged from the positioning holes 8-1 of the gliding guide rails 8, and the pull handles 10-1 are pulled backwards continuously to drive the latch frame to move backwards, so that the sliding blocks move backwards along the sliding guide rails, and then the back frame 1 the seat frame 2 and the lower frame 3 can close up together conveniently. Therefore, synchronous one-time folding in place is realized, the folding is smooth and quick, and the folded wheelchair has a small volume, is convenient to lean against a wall, occupies a small space in a vehicle trunk or under a bed and is also convenient to use when going out.

We claim:

1. A folding wheelchair, comprising a back frame (1), a seat frame(2), a lower frame (3), two rear wheel assemblies (4), two front wheel assemblies (5), a latch frame (6), armrests (9) and latches (10);

wherein the armrests (9) and the seat frame (2) are each independently hinged to the back frame (1) from top to bottom in sequence, and the two front wheel assemblies (5) are assembled and connected with the lower frame (3);

and wherein a sliding guide rail (8) is arranged between one end of the seat frame (2) and each rear wheel assembly (4), and a sliding block (7) is arranged on each sliding guide rail (8) in a sliding fit manner;

and wherein the sliding blocks (7) are hinged with the lower end of the back frame (1) and are also hinged, assembled and connected with the lower frame (3), or the lower end of the back frame (1) is hinged with the sliding blocks (7) and is also hinged, assembled and connected with the lower frame (3), or the lower frame (3) is hinged with the lower end of the back frame (1) and is also hinged, assembled and connected with the sliding blocks (7);

and wherein each sliding block (7) comprises a lock cylinder (7-1) extending outwards from the side surface of the sliding block, the latch frame (6) is fixedly connected with the lock cylinders (7-1), the latch frame (6) is a C-shaped tube, the latches (10) are assembled and connected in the tube in a sliding fit manner, and each lock cylinder (7-1) is provided with a stepped latch hole (7-2);

and wherein each latch (10) comprises a pull handle (10-1), a pull rod (10-2), a spring (10-3), a bolt (10-4) and a jackscrew (10-5); the pull handle (10-1) is fixedly connected to the pull rod (10-2), the pull rod (10-2) is assembled and connected in the tube of the latch frame (6) in a sliding fit manner, the handle (10-1) extends out of an opening of the C-shaped tube latch frame (6), one end of the pull rod (10-2), which is close to the sliding block (7), is provided with the bolt (10-4), and the bolt (10-4) penetrates through the latch hole (7-2) and is fixedly connected with the pull rod (10-2) through the jackscrew (10-5); and the spring is sleeved on the bolt(10-4), one end of the spring (10-3) is abutted against step surface of the stepped latch bole (7-2), and the other end of the spring (10-3) is abutted against a step surface arranged on the bolt (10-4).

2. The folding wheelchair according to claim 1, characterized in that: each rear wheel assembly (4) comprises a rear wheel bracket (4-1) and a rear wheel (4-2), and the sliding guide rail (8) is arranged between one end of the seat frame (2) and the rear wheel bracket (4-1) of each rear wheel assembly (4); and each front wheel assembly (5) comprises a front wheel bracket (5-1) and a front wheel (5-2), and the front wheel bracket (5-1) of each front wheel assembly (5) is hinged, assembled and connected with the lower frame (3) and the seat frame (2) respectively.

3. The folding wheelchair according to claim 1, characterized in that: the rear wheel bracket (4-1) of one rear wheel assembly (4) is assembled and connected with an electrically driven transmission part (12), and the electrically driven transmission part (12) is linked with one rear wheel (4-2) in a transmission manner and is electrically connected with an electric controller (9-2) arranged on one armrest (9).

4. The folding wheelchair according to claim 1, characterized in that: the lower frame (3) is also assembled and connected with foot rests (11).

5. The folding wheelchair according to claim 1, characterized in that: an armrest support rod (9-1) is also hinged between each armrest (9) and the frame (2).

6. The folding wheelchair according to claim 1, characterized in that: each sliding block (7) is also provided with a fixing plate (7-3), the, outer wall of the latch frame (6) is provided with a latch frame mounting plate (6-1), and the latch frame mounting plate (6-1) is fixedly connected with the fixing plates (7-3) of the sliding blocks (7).

* * * * *